US009667170B2

(12) United States Patent
Correa Vasquez et al.

(10) Patent No.: US 9,667,170 B2
(45) Date of Patent: May 30, 2017

(54) OPERATING METHOD FOR AN INVERTER AND GRID FAULT TOLERANT INVERTER

(71) Applicant: SMA Solar Technology AG, Niestetal (DE)

(72) Inventors: Pablo Correa Vasquez, Bad Neustadt an der Saale (DE); Tobias Mueller, Escherode (DE); Henrik Wolf, Kassel (DE)

(73) Assignee: SMA Solar Technology AG, Niestetal (DE)

( * ) Notice: Subject to any disclaimer, the term of this patent is extended or adjusted under 35 U.S.C. 154(b) by 429 days.

(21) Appl. No.: 14/144,783

(22) Filed: Dec. 31, 2013

(65) Prior Publication Data
US 2014/0112039 A1   Apr. 24, 2014

Related U.S. Application Data

(63) Continuation of application No. PCT/EP2012/062562, filed on Jun. 28, 2012.

(30) Foreign Application Priority Data

Jul. 4, 2011   (DE) .................. 10 2011 051 548

(51) Int. Cl.
H02M 7/487   (2007.01)
H02M 7/483   (2007.01)
(Continued)

(52) U.S. Cl.
CPC .......... *H02M 7/487* (2013.01); *H02M 7/483* (2013.01); *H02J 3/24* (2013.01); *H02M 7/49* (2013.01);
(Continued)

(58) Field of Classification Search
CPC .. H02M 1/32; H02M 2001/325; H02M 7/483; H02M 7/583; H02M 7/5395; H02M 7/487; H02M 2007/4835; H02M 7/49
See application file for complete search history.

(56) References Cited

U.S. PATENT DOCUMENTS 4,827,150 A   5/1989   Reynal
8,023,234 B2  9/2011   Andersen
(Continued)

FOREIGN PATENT DOCUMENTS

CN   102074974 A    5/2011
DE   102006028103 A1  12/2007
(Continued)

OTHER PUBLICATIONS

The age of mulit level converters arrives, Franquelo et al. Jun. 2008.*
(Continued)

*Primary Examiner* — Fred E Finch, III
*Assistant Examiner* — Rafael O De Leon Domenech
(74) *Attorney, Agent, or Firm* — Eschweller & Potashnik, LLC

(57) ABSTRACT

The disclosure relates to a method for operating an inverter that includes at least one bridge assembly that is actuated in a modulated manner for supplying electrical power to an energy supply network. Initially, the inverter is operated by the unipolar actuation of the at least one bridge assembly and the energy supply network is monitored for the presence of a network fault. If a network fault is detected, the inverter is operated at least at intervals by the bipolar actuation of the at least one bridge assembly. The disclosure further relates to a network fault-tolerant inverter which is equipped for carrying out the method.

19 Claims, 3 Drawing Sheets

(51) Int. Cl.
   *H02M 1/32*    (2007.01)
   *H02M 7/5395*  (2006.01)
   *H02M 7/49*    (2007.01)
   *H02J 3/24*    (2006.01)

(52) U.S. Cl.
   CPC .... *H02M 7/5395* (2013.01); *H02M 2001/325* (2013.01); *H02M 2007/4835* (2013.01)

(56) References Cited

U.S. PATENT DOCUMENTS

| | | | |
|---|---|---|---|
| 8,379,353 B2 | 2/2013 | Andersen | |
| 8,750,005 B2* | 6/2014 | Fujii | H02M 7/537 363/132 |
| 2009/0244936 A1 | 10/2009 | Falk et al. | |
| 2009/0285002 A1 | 11/2009 | Benesch et al. | |
| 2011/0069420 A1* | 3/2011 | Chiu | H02M 1/36 361/91.1 |
| 2011/0109285 A1* | 5/2011 | El-Barbari | H02M 7/487 323/282 |

FOREIGN PATENT DOCUMENTS

| | | |
|---|---|---|
| EP | 2107672 A1 | 10/2009 |
| JP | H11252970 A | 9/1999 |
| WO | 2006069568 A1 | 7/2006 |

OTHER PUBLICATIONS

Thermal optimised modulation methods of three-level neutral-point-clamped inverter for 10 MW wind turbines under low-voltage ride through K. Ma F. Blaabjerg, Jun. 13, 2011, http://www.corpe.et.aau.dk/digitalAssets/59/59257_3.pdf.*

International Preliminary Report on Patentability Dated Jan. 7, 2014 U.S. Appl. No. 14/144,783.

German Search Report dated Jun. 18, 2012 for German application No. 10 2011 051 548.8. 5 Pages.

International Search Report dated Oct. 26, 2012 for International application No. PCT/EP2012/062562. 2 Pages.

* cited by examiner

OPERATING METHOD FOR AN INVERTER AND GRID FAULT TOLERANT INVERTER

REFERENCE TO RELATED APPLICATIONS

This application is a continuation of International application number PCT/EP2012/062562 filed on Jun. 28, 2012, which claims priority to German application number 10 2011 051 548.8 filed on Jul. 4, 2011.

FIELD

The disclosure relates to a method for operating an inverter having at least one bridge arrangement that can be actuated in a modulated manner for feeding electrical power into a power supply grid. The disclosure also relates to a grid fault tolerant inverter.

BACKGROUND

Inverters are used to convert direct current, for example generated by a photovoltaic generator of a photovoltaic installation, into an alternating current suitable for feeding into a power supply grid. In view of the increasing spread of regenerative power generation plants, in particular photovoltaic installations, the requirements of the power supply companies with respect to parameters such as the current which is fed in are increasing. On the part of the operators of power supply grids there is often the requirement, as is specified in the so-called grid code, that, in the event of grid disturbances, for example in the event of voltage dips, regenerative power generation plants must be able to ride through the grid disturbance (fault ride-through—FRT) rather than be shut down, as was usual in the past. In this way, firstly, power can be fed into the power supply grid again as directly as possible at the end of the grid disturbance and, secondly, the power supply grid can be sustained, with respect to the voltage thereof, during the grid fault by feeding in reactive current. By way of example, a grid fault is present if the amplitude or rms (root mean square) value of a single-phase grid voltage is below a minimum value. In the case of power grids which supply multiphase power, an analogous definition can be given based on the average amplitudes of the individual phases, for example. Due to the significantly reduced grid voltage in such a case, only a small rms output voltage from the inverters is necessary to generate the required reactive and/or active current.

Inverters usually have at least one bridge arrangement via which an AC-voltage-side output of the inverter can be connected by means of semiconductor power switches to at least two different DC voltage potentials alternately. To control the level of the output voltage and to adjust the desired course of the output voltage, which shall be as sinusoidal as possible, a pulse width modulation (PWM) method is usually used. Good conversion efficiency can be achieved using so-called multilevel inverters, in which semiconductor power switches are arranged such that more than two different voltage levels are connectable to the AC-voltage-side output (multilevel modulation, for example three-level modulation). In order to actuate the semiconductor power switches of the bridge arrangement, which are at very different DC voltage potentials, actuation signals at likewise very different DC voltage potentials are correspondingly necessary. For this purpose, so-called bootstrap capacitors are often used on an actuation circuit, wherein the desired potential for the actuation of the semiconductor power switches is built up in the bootstrap capacitors. In this case, the bootstrap capacitors provided for supplying the power for the actuation of the semiconductor power switches that are at a high positive potential (high-side switches) are, in particular, charged during the on-time of the semiconductor power switches of the bridge arrangement that are at a lower potential (low-side switches).

However, during grid fault ride-through, the drive level, that is to say the ratio of the lengths of the periods when a semiconductor power switch is actuated to the periods when the semiconductor power switch is not actuated, can become so low that the bootstrap capacitors are not sufficiently recharged. As a result, the semiconductor power switches that are actuated by means of the bootstrap capacitors can no longer be switched. One solution to this problem can be achieved by using bootstrap capacitors with a correspondingly higher capacitance, so that activation can take place over the required period of the FRT even in the case of temporarily recharging the bootstrap capacitors only little or not at all. The use of bootstrap capacitors with a higher capacitance is not desirable, however, owing to the higher costs and the greater space requirement associated with such capacitors.

SUMMARY

In one embodiment a method for the operation of an inverter is disclosed, by means of which method the above-mentioned problems of the insufficient charging of bootstrap capacitors can be solved without bootstrap capacitors with a higher capacitance having to be used. The embodiment also specifies an inverter that is tolerant to grid faults by means of such an operating method.

A method, according to the disclosure, for operating an inverter of the type mentioned at the outset comprises the following. The inverter is operated by unipolar actuation of the at least one bridge arrangement, and the power supply grid is monitored for the presence of a grid fault. The inverter is then at least temporarily operated by bipolar actuation of the at least one bridge arrangement if a grid fault is detected.

In the case of bipolar actuation, as occurs with two-level modulation, for example, a low output voltage of the bridge arrangement is achieved at a low drive level by switching on the high-side bridge switch and the low-side bridge switch alternately. The average level of the output voltage results from the time ratio of the switched-on periods of the two bridge switches, also known as the duty ratio. At only a low output voltage, the duty ratio deviates only slightly from the value 1:1. Therefore, the low-side bridge switch is on, on average, for approximately the duration of half of one clock period per clock period. The bipolar actuation therefore results in, on average, sufficiently long times for charging bootstrap capacitors, even at a low drive level. The use of bootstrap capacitors of a larger capacitance, by means of which the actuation can be maintained for at least some time even when recharging is inadequate, can thus be dispensed with.

In one advantageous embodiment of the method, the inverter is operated by bipolar actuation of the at least one bridge arrangement for a period of time during which the presence of the grid fault is detected. In this embodiment of the method, the inverter is operated by bipolar actuation for the entire duration of a detected grid fault, as a result of which the sufficient charging of the bootstrap capacitors is ensured.

In another embodiment of the method, the inverter is alternately operated by unipolar and bipolar actuation of the at least one bridge arrangement for a period of time during which the presence of the grid fault is detected. This embodiment offers a compromise between ensured recharging of the bootstrap capacitors in the phase of bipolar actuation and an operation of the inverter as effective as possible in the phase of unipolar actuation, as occurs during three-level modulation, for example.

In another embodiment of the method, the presence of the grid fault is detected as a function of a level of an rms value of a grid voltage of the power supply grid. The rms value of the grid voltage directly affects the drive level of the bridge switches of the bridge arrangement and is therefore a suitable criterion for the changeover between unipolar and bipolar actuation of the bridge switches.

A grid fault tolerant inverter, according to the disclosure, for feeding electrical power into a power supply grid comprises at least one bridge arrangement with bridge switches. The inverter further comprises a pulse width modulation circuit for selectively either unipolar or bipolar actuation of the at least one bridge arrangement and a monitoring device for detecting grid faults. The inverter is configured to operate the at least one bridge arrangement at least temporarily by bipolar actuation in case a grid fault is detected, and to operate the at least one bridge arrangement by unipolar actuation in case no grid fault is detected. The attainable advantages correspond to those which are described in connection with the methods.

BRIEF DESCRIPTION OF THE DRAWINGS

The disclosure will be explained in more detail below on the basis of embodiments with reference to three figures.

In the figures.

DETAILED DESCRIPTION

Figure 1:
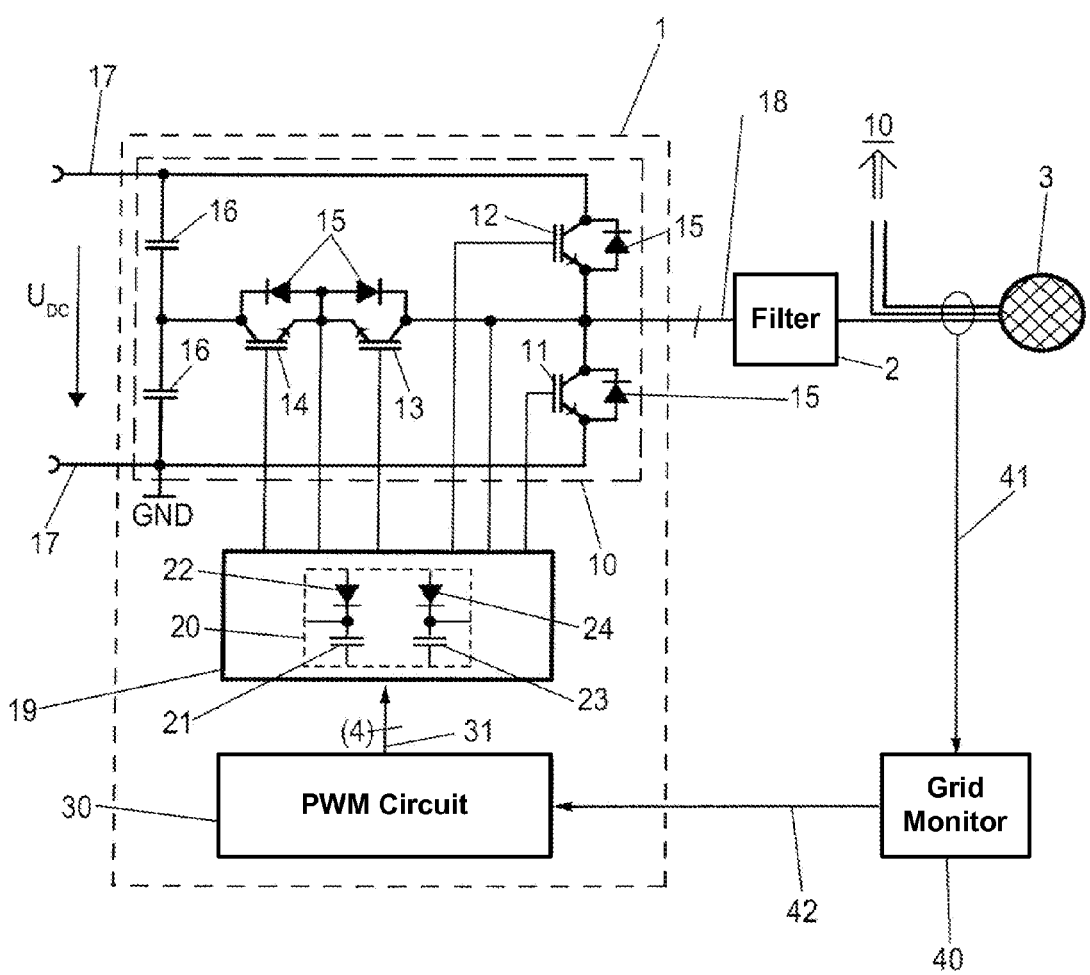
FIG. 1 shows a basic circuit diagram of a detail from a grid fault tolerant inverter.

FIG. 1 shows a basic circuit diagram of a detail from an inverter 1 for feeding electrical power into a power supply grid 3. By way of example, the inverter 1 can be part of a photovoltaic installation. A filter 2 is arranged between the inverter 1 and the power supply grid 3. The filter 2 can, for example, comprise a combination of inductive and capacitive elements. The filter 2 forms a voltage course which is as sinusoidal as possible and, for this reason, is also referred to as sine-wave filter 2. The sine-wave filter 2 can be embodied as a separate element, as illustrated in the figure, or alternatively can also be integrated in the inverter 1.

It is noted that further elements—not illustrated in the figure—can be provided between the inverter 1 and the power supply grid 3. By way of example, such elements can be switching parts or fuse parts.

The inverter 1 is configured to feed into the power supply grid 3 on three phases. The number of three phases is intended to be understood as being merely by way of example; an inverter according to the disclosure and a method according to the disclosure can likewise be suitable for operation with any desired number of phases, in particular for single-phase operation.

In accordance with the number of three phases, the inverter 1 has three bridge arrangements. For reasons of clarity, only one bridge arrangement 10 is illustrated in the figure. The bridge arrangements which are not shown are embodied essentially analogously to the one illustrated, although some of the components (for example the capacitors 16, see below) do not have to be present in all of the bridge arrangements but rather can be used jointly by all of the bridge arrangements.

The bridge arrangement 10 is connected via two inputs 17 to a direct current source and has a DC voltage $U_{DC}$ applied to it by the direct current source. When using the inverter 1 in a photovoltaic installation, the direct current source is a photovoltaic generator which is connected to the inverter either directly or indirectly with the interposition of a DC voltage transformer.

On the alternating current side, the bridge arrangement 10 is connected via an output 18 to the sine-wave filter 2 and therefore to a phase of the power supply grid 3. The other two phases of the power supply grid 3 are connected, as indicated in FIG. 1, to the further bridge arrangements 10 of the inverter 1, which are not shown. Sine-wave filters—not shown in the figure—are also provided in this case. It is also possible for all phases jointly to use a suitable polyphase sine-wave filter.

The output signal from the inverter 1 is a clocked DC voltage signal, wherein the clock frequency, that is to say the number of switching cycles per second, can be in the range from one kilohertz to a few tens of kilohertz. A bridge arrangement which is configured as a half-bridge is provided in parallel with the inputs 17 of the inverter 1, the bridge arrangement having two bridge switches 11 and 12 which are connected in series and each have an associated freewheeling diode 15. The center tap between the bridge switches 11 and 12 forms the output 18. The output 18 can have the negative or the positive potential at the inputs 17 applied to it by means of the bridge switches 11 and 12. By way of example, IGBTs (insulated gate bipolar transistors) are used as bridge switches 11 and 12. However, other semiconductor power switches can also be used, for example bipolar transistors or MOSFETs (metal-oxide semiconductor field-effect transistors). Depending on the type of transistor used, the freewheeling diode 15 arranged in antiparallel with the switching path of the transistor can be embodied as a separate component or can be already integrated in the transistor. Two series-connected capacitors 16 are likewise arranged in parallel with the inputs 17. The center tap between the capacitors 16 is connected to the output 18 via a bidirectional switch formed from two further bridge switches 13 and 14. Freewheeling diodes 15 are connected in parallel here, too. The capacitors 16 are used firstly to smooth the input voltage $U_{DC}$ in the event of pulsed current draw by the inverter 1. Secondly, a virtual zero potential is established at the center tap of the capacitors, which zero potential is between the potentials at the inputs 17 and to which zero potential the output 18 can be connected via the further bridge switches 13 and 14 or the associated freewheeling diodes 15.

Owing to the possibility of setting, depending on the switching state of the bridge switches 11-14, three different voltage levels at the output 18, the bridge arrangement is also designated as three-level topology or, more precisely, three-level neutral-point clamped converter (3L-NPC).

In order to actuate the bridge switches 11-14, an actuation circuit 19 is provided for each bridge arrangement 10, the circuit 19 having, inter alia, a so-called bootstrap circuit 20 with bootstrap capacitors 21, 23 and bootstrap diodes 22, 24. As the reference-ground potential GND internal to the inverter, the negative potential at the inputs 17 is usually selected. In order to actuate the bridge switches 11-14, a potential which is a few volts above the potential at the negative connection (emitter) thereof is required at the switching input (gate) thereof. This is not problematic in the case of the bridge switch 11, the negative connection of which is at GND potential, for which reason it is also called a low-side bridge switch. In the case of the bridge switches 12-14, however, the negative connection is at a potential which is higher than the GND potential by $U_{DC}/2$, for which reason the bridge switches 12-14 are also called high-side bridge switches. The potential necessary for switching is built up in the bootstrap capacitors 21, 23 by the bootstrap circuit 20 during those periods of time in which the low-side bridge switch 11 is on, by virtue of the bootstrap capacitors being alternately charged via a reference potential, the bootstrap diodes 22, 24 and the low-side bridge switch 11 and then being connected to the potential at the negative connection of the high-side bridge switches 12-14.

A pulse width modulation (PWM) circuit 30 is further provided, which circuit generates actuation signals at control outputs 31 for the bridge switches 11-14 such that a predefined course of a reference voltage, which is formed from a course of the grid voltage of the power supply grid 3, is reproduced. Hence the voltage profile that is output at the output 18 of the inverter 1 and is smoothed by means of the sine-wave filter 2 follows that of the grid voltage; the inverter 1 is in sync with the grid.

Figure 2A:
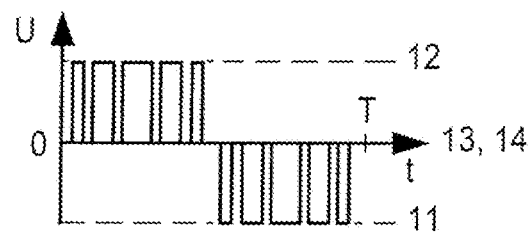
FIGS. 2*a*-2*c* show various examples, illustrated in graphs, of the output voltage of a bridge arrangement for different actuation patterns and drive levels.

FIG. 2a illustrates, by way of example, a course of an output voltage U at the output 18 of the bridge arrangement 10, that is to say at the input of the sine-wave filter 2. The course shown is generated by the pulse width modulation circuit 30 at the control outputs 31 using an appropriate actuation pattern for the four switches 11-14. The dependency of the output voltage U on a time t for the duration T of a period of the grid frequency is shown.

The curve course emerges from the switching states of the bridge switches 11-14, that is to say depending on whether the bridge switch 11, the bridge switch 12 or one of the bridge switches 13 or 14 is on.

FIG. 2a shows actuation in the case of three-level modulation at a high drive level, as occurs in feed-in mode at full grid voltage. Since, within each half-cycle of the grid voltage, that is to say in the periods of time $0<t\leq T/2$ and $T/2<t\leq T$, in each case as a complement to the bridge switches 13 and 14, only either the bridge switch 11 or the bridge switch 12 is on, the actuation is also designated as unipolar. The times in which the low-side bridge switch 11 is on are, on average, sufficiently long to build up a sufficient amount of charge in the bootstrap capacitors 21, 23, with the result that the high-side bridge switches 12-14 can be actuated in the following half-cycle.

Figure 2B:
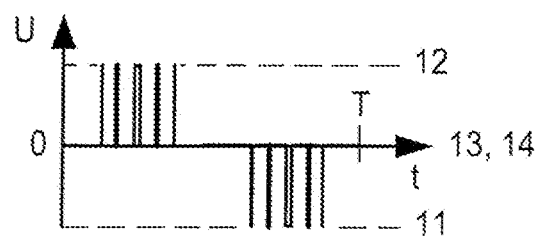

FIG. 2b illustrates, in the same way as FIG. 2a, a course of the output voltage U of the bridge arrangement 10, this case involving the use of actuation with three-level modulation at a low drive level. According to the prior art, such a situation arises in the case of a low grid voltage, for example in the case of a grid voltage dip in the event of a grid fault. The times during which the low-side bridge switch 11 is on are not sufficient in this case to build up a sufficient amount of charge in the bootstrap capacitors, and so the high-side bridge switches cannot be actuated reliably in the following half-cycle.

Figure 2C:
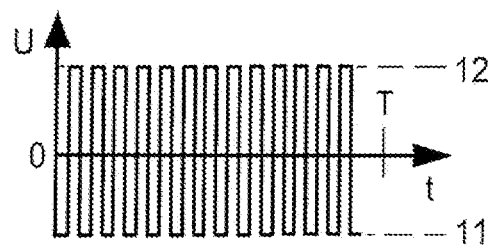

In the event of such a fault, the operating method according to the disclosure for an inverter provides for changeover from the unipolar actuation to bipolar actuation of two-level modulation. A corresponding course of the output voltage U owing to a bipolar actuation pattern is reproduced in FIG. 2c, again in the same way as in FIGS. 2a and 2b. In the case of the bipolar actuation, the bridge switches 13, 14 are not switched on, whereas the bridge switches 11, 12 are switched on alternately. The average level of the output voltage results from the time ratio of the switched-on periods of the two bridge switches 11, 12, also known as the duty ratio. At only a low output voltage, the duty ratio deviates only slightly from the value 1:1. Therefore, the low-side bridge switch 11 is on, on average, for approximately the duration of half of one clock period per clock period. Hence, the bipolar actuation results in, on average, sufficiently long times for charging the bootstrap capacitors 21, 23, even at a low drive level.

Figure 3:
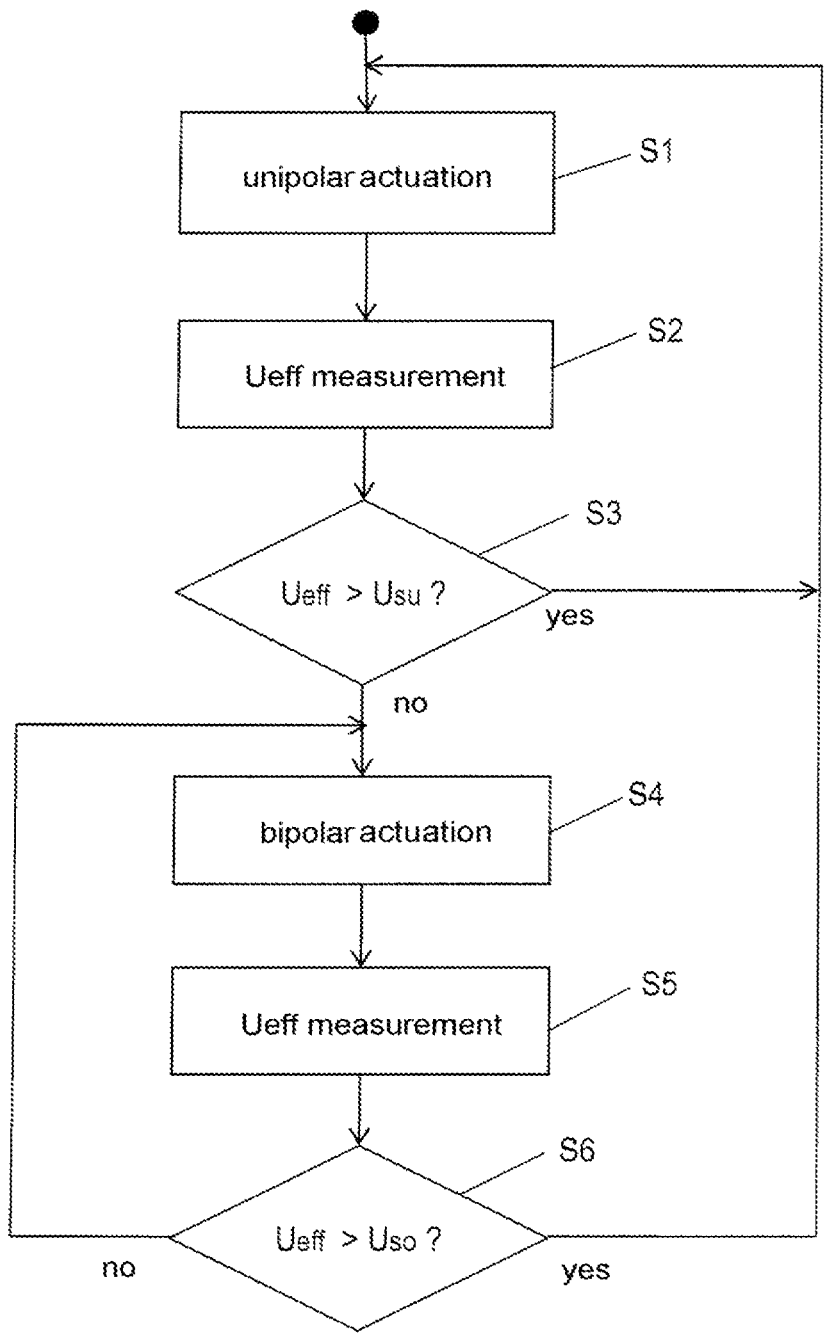
FIG. 3 shows a flow chart of a method for operating an inverter.

FIG. 3 shows a schematic flow chart of an embodiment of an operating method for an inverter, as can be performed by the inverter 1 shown in FIG. 1, for example. The method is described by way of example below with reference to FIG. 1. The reference signs used correspondingly relate to FIG. 1.

At S1 of the method, unipolar actuation of the bridge switches 11-14 of a bridge arrangement 10 is initially established. The inverter 1 is operated (clocked) using the unipolar actuation. At S2, an rms voltage Ueff of the power supply grid 3 is then determined during the unipolar actuation, for example, for the phase to which the corresponding bridge switching arrangement 10 is connected.

At S3, the measured rms voltage Ueff is compared with a first predefined threshold voltage Usu, also called lower threshold voltage. If it was determined at S3 that the rms voltage Ueff is greater than the first threshold voltage Usu, the method branches back to S1. The inverter 1 is therefore operated further with unipolar actuation. If, however, it is determined at S3 that the rms voltage Ueff is less than or equal to the first threshold voltage Usu, the method is continued at S4.

At S4, bipolar actuation of the bridge switches 11-14 of the bridge arrangement 10 is set up and the inverter 1 is consequently operated (clocked) with the bipolar actuation of the bridge switches 11-14. At S5, the rms voltage Ueff of the power supply grid 3 is then again determined during the bipolar actuation and, at S6, is compared with a second predefined threshold voltage Uso, also called upper threshold voltage.

If it is determined at S6 that the rms voltage Ueff is less than or equal to the second threshold voltage Uso, the method branches back to S4, in which the inverter 1 is operated further with bipolar actuation. If, however, it is determined at S6 that the rms voltage Ueff is greater than the second threshold voltage Uso, the method branches back to S1, as a result of which a changeover to the unipolar actuation again is made.

The threshold voltages Usu, Uso therefore define limit values for the rms voltage of a phase of the power supply grid 3, which limit values are used to detect a grid fault. While a grid fault defined in this way is detected, a changeover to the bipolar actuation of the bridge switches is made. In this case, the second threshold voltage Uso is in one embodiment (slightly) larger than the first threshold voltage Usu, as a result of which a changeover hysteresis is achieved. This prevents uncontrolled alternation between the unipolar and bipolar actuation if the level of the rms voltage Ueff is precisely in the range of the threshold values. It is noted that the presence of a grid fault within the meaning of the disclosure as well as the level of the threshold voltages Usu, Uso are defined for sufficient charging of the bootstrap capacitors 21, 23. Nevertheless, the definition of the circumstances under which a grid fault is present within the meaning of the method according to the disclosure can match other definitions of grid faults, for example from grid codes.

In the embodiment of the method illustrated in FIG. 3, it is accordingly provided that a changeover from the unipolar to the bipolar actuation will be made for the entire duration of a grid fault. Alternatively, provision may be made for continual changeover between unipolar and bipolar actuation for the duration of the grid fault. In this case, the intervals in which one or the other actuation occurs may be as short as the duration of one period of the PWM method itself or else can be chosen to be longer by any desired amount, an upper limit for the interval length of the unipolar actuation being limited by the aforesaid problems in the prior art. There may be provision, in intervals in which the rms output voltage of the inverter 1 during unipolar actuation is equal to zero, for bipolar clock cycles with a duty ratio of exactly 1:1 to be inserted, as a result of which the charging of the bootstrap capacitors is ensured. Alternatively, by means of a duty ratio which deviates from the value 1:1, rms output voltages other than zero can be attained even in the intervals of bipolar actuation.

In order to implement one of the aforesaid methods, a grid monitoring device 40 is provided for the inverter 1 illustrated in FIG. 1, the grid monitoring device 40 being connected to the power supply grid 3 via a reference-signal input 41, wherein this can be done by means of an interposed transmission network. The grid monitoring device 40 monitors at least the time course of the voltages of the power supply grid 3 and detects a grid fault situation on the basis of predefined, possibly normalized criteria. The grid fault situation is signaled by means of an error signal at an error signal output 42. The grid monitoring device 40 can be integrated in the inverter 1 or else can be a separate, possibly central device.

The error signal output 42 is connected to the pulse width modulation circuit 30, wherein the latter is designed to change over from unipolar actuation to bipolar actuation of the bridge arrangement depending on the error signal. The changeover can take place, according to the abovedescribed different embodiments of the method, permanently for the duration of a grid fault, or alternately during the period of the grid fault.

As an alternative to the design reproduced in FIG. 1, two separate pulse width modulation circuits can also be present, one for the unipolar and one for the bipolar actuation, wherein a changeover unit forwards the actuation signals from one or the other pulse width modulation circuit to the bootstrap circuit depending on the error signal.

The invention claimed is:

1. A method for operating an inverter having a bootstrap circuit comprising at least one bootstrap capacitor and at least one bridge arrangement that is actuated in a modulated manner for feeding electrical power into a power supply grid, comprising:
    operating the inverter by unipolar actuation of the at least one bridge arrangement;
    monitoring the power supply grid for the presence of a grid fault; and
    at least temporarily operating the inverter by bipolar actuation of the at least one bridge arrangement in a continuous switching manner for sufficiently long times for charging the at least one bootstrap capacitor such that recharging of the bootstrap capacitor is ensured if a grid fault is detected.

2. The method as claimed in claim 1, wherein the inverter is operated by bipolar actuation of the at least one bridge arrangement for a period of time during which the presence of the grid fault is detected.

3. The method as claimed in claim 1, wherein the inverter is alternately operated by unipolar and bipolar actuation of the at least one bridge arrangement for a period of time during which the presence of the grid fault is detected.

4. The method as claimed in claim 1, wherein the unipolar actuation results from a three-level modulation.

5. The method as claimed in claim 1, wherein the presence of the grid fault is detected as a function of a level of an rms value of a grid voltage of the power supply grid.

6. The method as claimed in claim 5, wherein a grid fault is detected as soon as the rms value is below a first threshold voltage.

7. The method as claimed in claim 6, wherein a grid fault is detected as long as the rms value is below a second threshold voltage, wherein the second threshold voltage is greater than the first threshold voltage.

8. A grid fault tolerant inverter for feeding electrical power into a power supply grid, comprising:
    at least one bridge arrangement with bridge switches;
    a bootstrap circuit comprising at least one bootstrap capacitor;
    a pulse-width modulation circuit configured to selectively actuate the at least one bridge arrangement in one of a unipolar or bipolar fashion; and
    a monitoring device configured to detect grid faults,
    wherein the pulse-width modulation circuit is configured to operate the at least one bridge arrangement at least temporarily by bipolar actuation for sufficiently long times for charging the at least one bootstrap capacitor such that recharging of the bootstrap capacitors is ensured in case a grid fault is detected, and to operate the at least one bridge arrangement by unipolar actuation in case no grid fault is detected.

9. The inverter of claim 8, wherein the pulse-width modulation circuit is configured to switch from a unipolar actuation of the at least one bridge arrangement to a bipolar actuation of the at least one bridge arrangement if an rms value of a grid voltage of the power supply grid is less than a first threshold value.

10. The inverter of claim 9, wherein the pulse-width modulation circuit is configured to switch from the bipolar actuation back to the unipolar actuation if the rms value of the grid voltage of the power supply grid is greater than a second threshold value, wherein the second threshold value is greater than the first threshold value and a difference between the first and second threshold values represents a changeover hysteresis of the inverter.

11. The inverter of claim 8, wherein the pulse-width modulation circuit is configured to alternately switch between a unipolar actuation of the at least one bridge arrangement and a bipolar actuation of the at least one bridge arrangement if an rms value of a grid voltage of the power supply grid is less than a first threshold value.

12. An inverter, comprising:
    a bridge arrangement configured to operate in a unipolar drive mode or a bipolar drive mode;
    a bootstrap circuit comprising at least one bootstrap capacitor;
    a grid monitor circuit configured to evaluate a status of a power supply grid at an output of the bridge arrangement and output an evaluation signal based thereon; and a pulse-width modulation circuit configured to generate mode control signals to the bridge arrangement to dictate one of the unipolar drive mode or the bipolar drive mode for at least a duration of a period of a grid frequency based on the evaluation signal such that the bridge arrangement is operated in bipolar drive mode for sufficiently long times for charging the at least one bootstrap capacitor and recharging of the bootstrap capacitors is ensured if the grid monitor indicates a grid fault.

13. The inverter of claim 12, wherein the pulse-width modulation circuit is configured to generate mode control signals that dictate the unipolar drive mode upon an initialization of the inverter.

14. The inverter of claim 12, wherein the evaluation signal comprises an rms value of a grid voltage of the power supply grid.

15. The inverter of claim 14, wherein the pulse-width modulation circuit is configured to generate control signals that change over the unipolar drive mode to the bipolar drive mode if the rms value of the grid voltage of the power supply grid is less than a first threshold value.

16. The inverter of claim 15, wherein the pulse-width modulation circuit is further configured to generate control signals that change over the bipolar drive mode back to the unipolar drive mode if the rms value of the grid voltage of the power supply grid is greater than a second threshold value, wherein the second threshold value is greater than the first threshold value.

17. The inverter of claim 16, wherein a difference between the first and second threshold values represents a changeover hysteresis of the inverter.

18. The inverter of claim 14, wherein the pulse-width modulation circuit is configured to generate control signals that change over between the unipolar drive mode and an alternating mode including both the unipolar drive mode and the bipolar drive mode if the rms value of the grid voltage of the power supply grid is less than a first threshold value.

19. The method as claimed in claim 1, wherein the bipolar actuation of the inverter further comprises operating by bipolar actuation for at least a duration of a period of a grid frequency.

* * * * *